US008471873B2

(12) United States Patent
Kawahara et al.

(10) Patent No.: US 8,471,873 B2
(45) Date of Patent: Jun. 25, 2013

(54) ENHANCED UI OPERATIONS LEVERAGING DERIVATIVE VISUAL REPRESENTATION

(75) Inventors: Hideya Kawahara, Mountain View, CA (US); Paul Byrne, Los Altos, CA (US); Frank E. Ludolph, Menlo Park, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1774 days.

(21) Appl. No.: 11/582,766

(22) Filed: Oct. 17, 2006

(65) Prior Publication Data

US 2008/0092110 A1    Apr. 17, 2008

(51) Int. Cl.
*G06F 3/048* (2006.01)
(52) U.S. Cl.
USPC ............................. 345/679; 715/851; 715/852
(58) Field of Classification Search
CPC .................................................... G06F 3/04815
USPC ................. 345/653, 664, 679, 440; 715/782, 715/850, 851, 852
See application file for complete search history.

(56) References Cited

U.S. PATENT DOCUMENTS

| | | | | | |
|---|---|---|---|---|---|
| 5,019,809 | A | * | 5/1991 | Chen | 340/815.42 |
| 6,654,027 | B1 | * | 11/2003 | Hernandez | 345/619 |
| 6,664,986 | B1 | * | 12/2003 | Kopelman et al. | 715/849 |
| 6,762,778 | B1 | * | 7/2004 | Golibrodski et al. | 715/849 |
| 6,909,443 | B1 | * | 6/2005 | Robertson et al. | 715/782 |
| 6,922,815 | B2 | * | 7/2005 | Rosen | 715/782 |
| 6,938,218 | B1 | * | 8/2005 | Rosen | 715/850 |
| 2002/0180809 | A1 | * | 12/2002 | Light et al. | 345/852 |
| 2003/0071810 | A1 | * | 4/2003 | Shoov et al. | 345/420 |
| 2004/0095349 | A1 | * | 5/2004 | Bito et al. | 345/440 |

OTHER PUBLICATIONS

3D Destop Project by Sun Microsystems: A Revolutionary Evolution of Today's Desktop, Jul. 27, 2004, Sun Microsystems, 1 page.*
Sun Microsystems Project Lookinglass screen shots from Internet Archive for Apr. 23, 2005, Sep. 9, 2010, http://web.archive.org/web/20050423192133/www.sun.com/software/looking_glass/details.xml, 7 pages.*
Janice J. Heiss; Going 3D with Project Looking Glass; Oct. 12, 2004; Sun Microsystems now Oracle; http://www.oracle.com/technetwork/articles/javase/lookingglass-138583.html; pp. 1-2.*

* cited by examiner

*Primary Examiner* — Jeffery A Brier
(74) *Attorney, Agent, or Firm* — Park, Vaughan, Fleming & Dowler, LLP; Shun Yao

(57) ABSTRACT

One embodiment of the present invention provides a system that facilitates manipulation of three-dimensional (3D) objects displayed in a two-dimensional (2D) display. During operation, the system displays perspectively a 3D object in a 2D display based on a coordinate system with an X-axis along a horizontal direction on the 2D display, a Y-axis along a vertical direction on the 2D display, and a Z-axis along a direction perpendicular to the plane of the 2D display. The system further derives a 2D image from the 3D object and displays the derived image within a virtual 2D plane substantially parallel to the Z-axis, thereby allowing movement of the derived image within the virtual plane to reflect movement of the 3D object. The system also allows a user to manipulate the 3D object by manipulating the derived image within the virtual plane.

28 Claims, 7 Drawing Sheets

ENHANCED UI OPERATIONS LEVERAGING DERIVATIVE VISUAL REPRESENTATION

BACKGROUND

1. Field of the Invention

The present invention relates to the design of graphic user interfaces (UIs). More specifically, the present invention relates to a method and system that facilitates enhanced UI operations leveraging derivative visual representation.

2. Related Art

Continuing advances in computational speed have led to tremendous improvements in graphics-rendering capabilities, especially in personal computers. Three-dimensional (3D) rendering, once considered a specialized, resource-intensive task, is beginning to be widely used to generate intuitive 3D effects for graphic user interfaces (GUIs).

However, screen size has not increased much in commonly used display devices. This makes it challenging to display large amounts of information, possibly in multiple applications each requiring large amounts of screen space. Consequently, displayed objects often overlap each other, making object manipulation difficult.

Further adding to this challenge is the limitation of conventional 2D pointing devices, such as a mouse. A 2D pointing device has two degrees of freedom, one along the X-axis and the other along the Y-axis. A 3D object, on the other hand, has one additional degree of freedom along the Z-axis. A 3D object is allowed to move not only within, but also "into" and "out of" the plane of the screen. Hence, when 3D objects overlap on a 2D screen, manipulating a target object using a 2D pointing device can be a complicated and frustrating task. Note that such challenges are present not only for 3D UIs but also for conventional 2D UIs as well, particularly with the increasing functionalities and complexities of applications.

In general, traditional input methods are becoming inadequate for manipulating different properties, including on-screen positioning, of applications. As applications grow more sophisticated, it is often desirable to display additional information of the application along with the corresponding visual representation. For example, certain UIs display tooltips or a contextual menu which is raised with a right mouse-click on the active window. However, displaying such information for many objects can visually obscure the objects, which results in a messy representation.

Hence, what is needed is a method that allows a user to manipulate properties or additional information of an application, middleware, or system using a simple input device like a 2D pointing device within a limited screen size in an intuitive and less complicated manner.

SUMMARY

One embodiment of the present invention provides a system that facilitates manipulation of three-dimensional (3D) objects displayed in a two-dimensional (2D) display. During operation, the system displays perspectively a 3D object in a 2D display based on a coordinate system with an X-axis along a horizontal direction on the 2D display, a Y-axis along a vertical direction on the 2D display, and a Z-axis along a direction perpendicular to the plane of the 2D display. The system further derives a 2D image from the 3D object and displays the derived image within a virtual 2D plane substantially parallel to the Z-axis, thereby allowing movement of the derived image within the virtual plane to reflect movement of the 3D object. The system also allows a user to manipulate the 3D-object by manipulating the derived image within the virtual plane.

In a variation on this embodiment, the system augments the derived image by displaying additional information for the 3D object.

In a variation on this embodiment, the system displays the virtual plane as a floor which is placed substantially at the bottom of the 2D display, a ceiling which is placed substantially at the top of the 2D display, a left wall which is placed substantially in the left portion of the 2D display, or a right wall which is placed substantially in the right portion of the 2D display.

In a variation on this embodiment, deriving the 2D image from the 3D object involves generating a projection, a shadow, or a reflection of the 3D object on the 2D virtual plane.

In a further variation, displaying additional information of the 3D object involves displaying the 3D object's name.

In a variation on this embodiment, displaying the derived image within the virtual plane involves displaying the derived image using a color associated with the 3D object.

In a variation on this embodiment, allowing the user to manipulate the 3D object involves allowing the user to move, select, minimize, maximize, or close the 3D object by manipulating the derived image.

In a variation on this embodiment, the system allows the user to determine whether the virtual 2D plane is visible.

One embodiment of the present invention provides a system that facilitates manipulation of application objects. During operation, the system displays an object corresponding to an application in a display and derives a secondary image based on the object. The system further displays the secondary image in the display and presents properties of the object within the derived image. In addition, the system allows a user to manipulate the object's properties visually presented within the derived image by operating on the derived image.

In a variation of this embodiment, the system presents the object's properties in a visually structured manner and allows the user to change the structure or relationship of the object's properties by operating on the derived image.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now know or later developed.

Overview

Embodiments of the present invention leverage modern graphics-rendering capabilities to display derivative images, such as a shadow and/or a reflection, of a 3D object to create an intuitive UI. This UI allows the user to operate on the shadow or reflection of the 3D object, instead of the object itself. This type of UI is intuitive because a user naturally associates an object with its shadow and/or reflection, since shadows and reflections are common in one's daily life.

The derived image of an object can be presented in a virtual 2D plane which is substantially perpendicular to the screen plane. Thus, by operating on the derived image, the user can easily move the 3D object along the Z-axis.

Computer System

Figure 1:
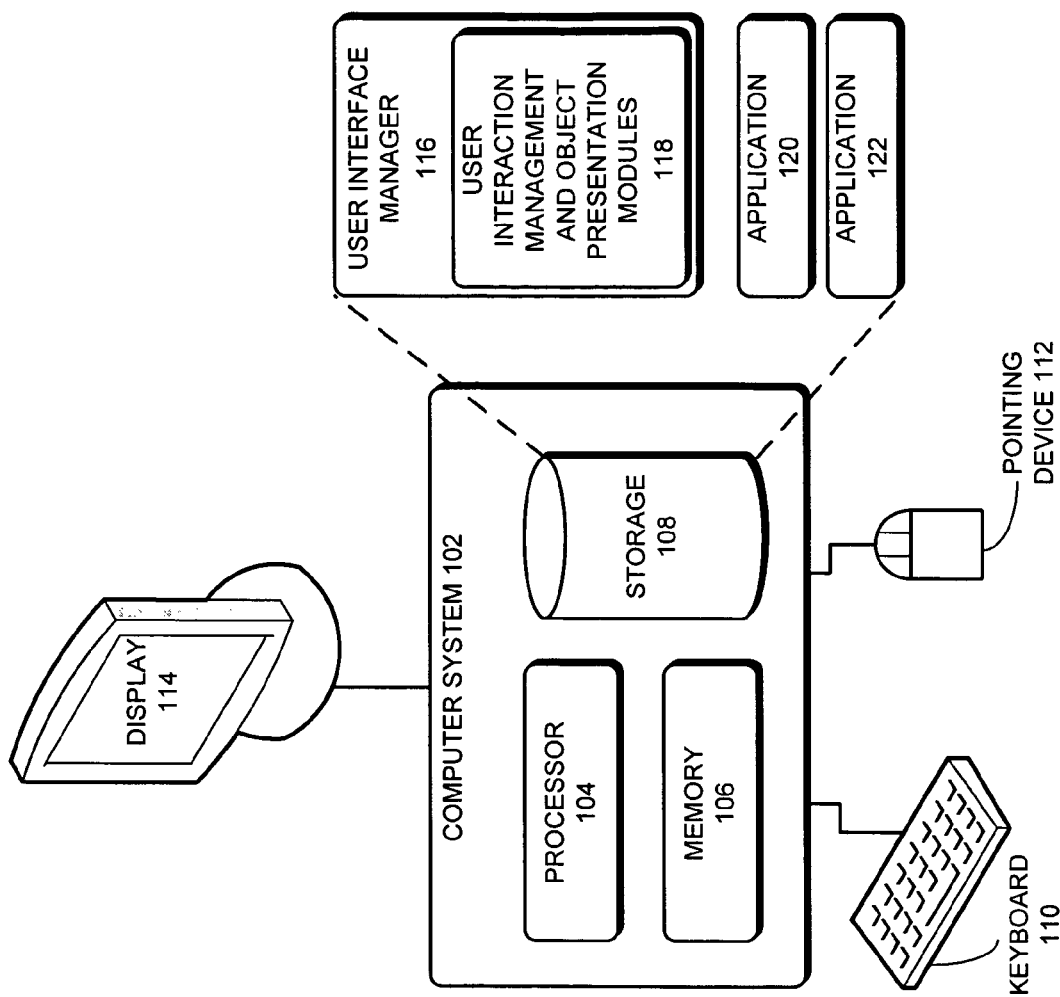
FIG. 1 presents a block diagram of a computer system 102 in accordance with an embodiment of the present invention.

FIG. 1 presents a block diagram of a computer system 102 in accordance with an embodiment of the present invention. Computer system 102 can generally include any type of computer system, including, but not limited to, a computer system based on a microprocessor, a mainframe computer, a digital signal processor, a portable computing device, a personal organizer, a device controller, and a computational engine within an appliance.

Computer system 102 includes a processor 104, a memory 106, and a storage device 108. Processor 104 can generally include any type of processor. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

A user interacts with computer system 102 through a keyboard 110 and a pointing device 112. Pointing device 112 can include, but is not limited to, a mouse, a trackball, a trackpad, a pen, and a stylus. Computer system 102 is coupled to a display 114, which displays a user interface to the user.

Storage device 108 contains a UI manager 116 and applications 120-122. UI manager 116 further includes user interaction management and object presentation modules 118, which are described in more detail in the description in conjunction with FIG. 6 below. Note that UI manager 116 may or may not reside within computer system 102. For example, UI manager 116 can operate from a server coupled to computer system 102 through a network.

3D User Interface

Figure 2:
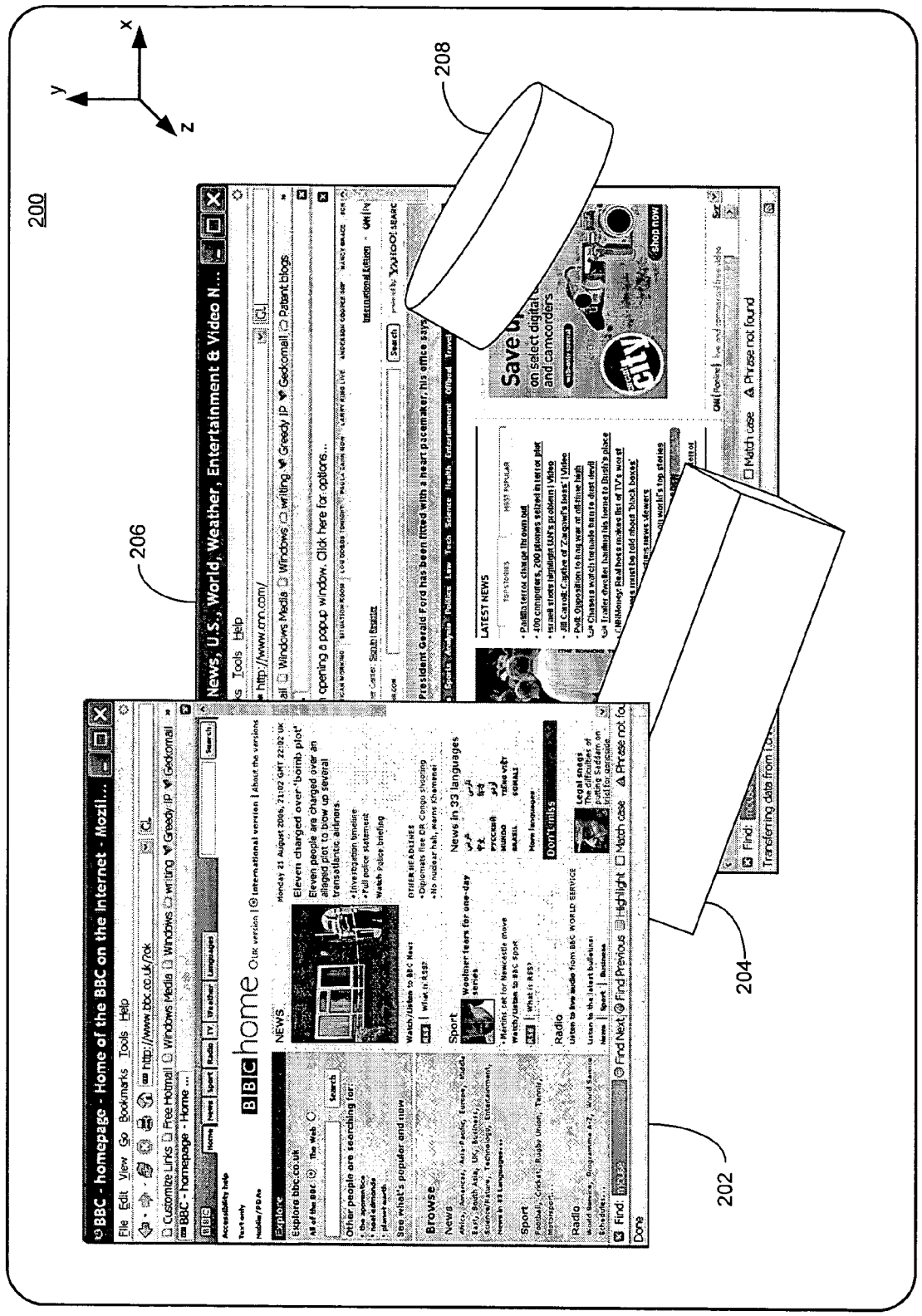
FIG. 2 illustrates a UI displaying 3D objects which are allowed to move in X, Y, and Z directions.

FIG. 2 illustrates a UI displaying 3D objects which are allowed to move in X, Y, and Z directions. A UI 200 can be any display area on a display device. For example, UI 200 can be the desktop of a window-based operating system, or a GUI of an application. UI 200 provides the space for displaying multiple visual objects, such as conventional 2D window objects 202 and 206, and 3D objects 204 and 208.

Although UI 200 is physically manifested in a 2D plane parallel to the X-Y plane, UI 200 can still display 3D objects 204 and 208 using perspective drawing. 3D objects 204 and 208 have one additional degree of freedom in the Z-axis direction. However, Z-axis movements are difficult to control using a conventional 2D pointing device such as a mouse. Some applications allow a user to control an object's Z-axis movements by special mouse operations, such as moving the mouse's middle wheel while holding down the "CTRL" key. However, such operations are typically cumbersome and counter-intuitive.

Embodiments of the present invention display additional derived images of 3D objects and allow a user to control the objects' movements by operating on these derived images. A derived image of a 3D object is typically a 2D image, such as a shadow, projection, or reflection, and is displayed within a virtual 2D plane substantially along the Z-axis. The virtual 2D plane can be, for example, a floor at the bottom of the screen, a ceiling at the top of the screen, or a left or right wall on the left or right portion of the screen. Furthermore, the virtual 2D plane can be transparent, semi-transparent, or solid. Other positions, textures, and colors of the virtual 2D plane are possible.

Figure 3:
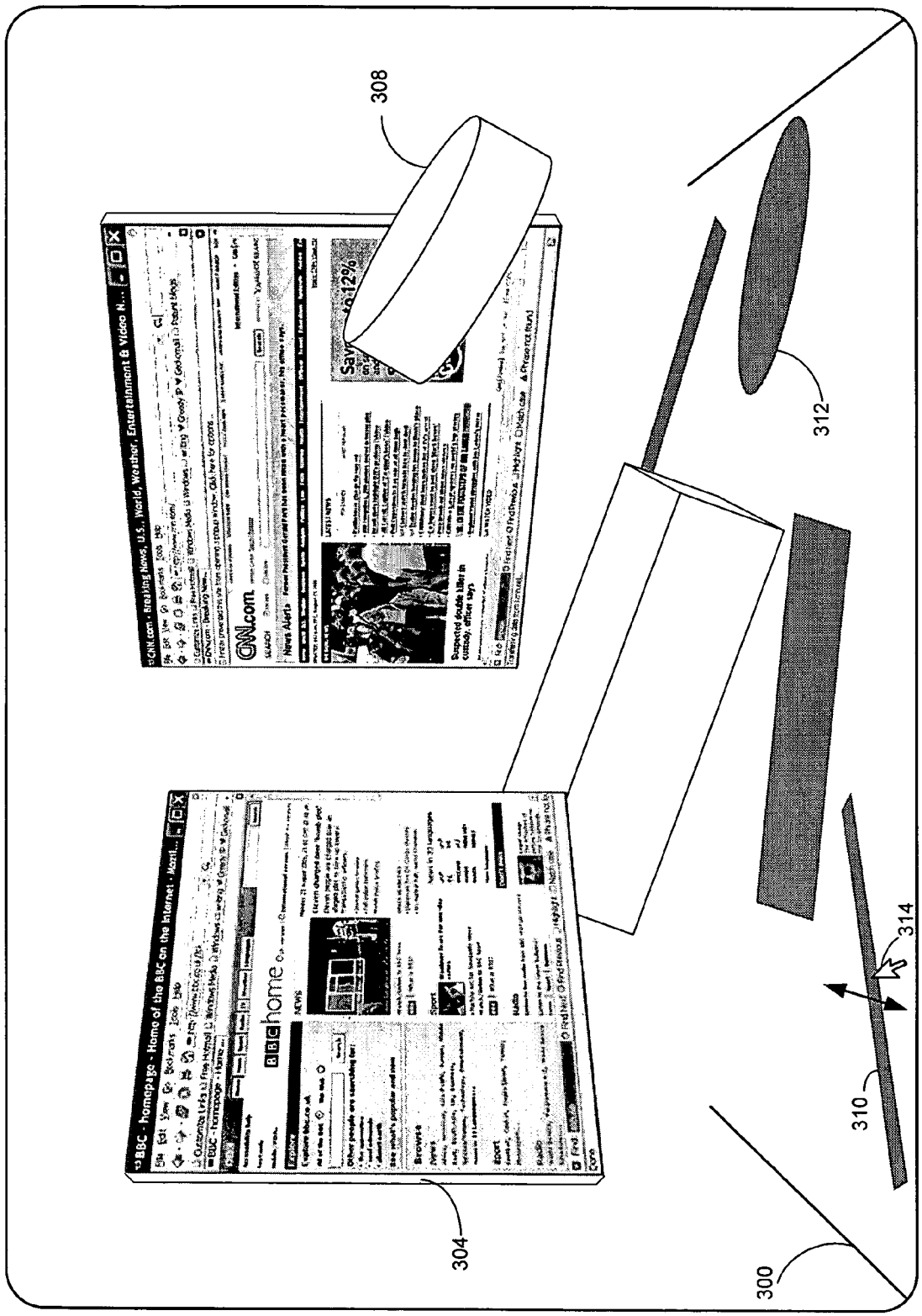
FIG. 3 illustrates a UI displaying 3D objects and their corresponding shadows on a virtual floor in accordance with an embodiment of the present invention.

FIG. 3 illustrates a UI displaying 3D objects and their corresponding shadows on a virtual floor in accordance with an embodiment of the present invention. The UI displays a virtual floor 300 at the bottom of the screen. Virtual floor 300 is perpendicular to the screen plane and is drawn perspectively, extending to the "inside" of the screen. The UI also presents 3D objects 304 and 308 above virtual floor 300 and displays their corresponding shadows 310 and 312 on virtual floor 300.

The UI further allows a user to operate on shadows 310 and 312 to manipulate 3D objects 304 and 308. In one embodiment, a user can use a 2D pointing device, such as a mouse, to control a cursor 314, select shadow 310, and to drag shadow 310 within virtual floor 300 to move 3D object 304 along the Z axis. This operation is intuitive because the user can easily associate shadow 310 with object 304. In addition, manipulating shadow 310 within virtual floor 300, which is a 2D plane, is more maneuverable than manipulating object 304 directly, since shadow 310 has only two degrees of freedom within virtual floor 300. Other maneuvers, such as tilting, rotating, enlarging, reducing, maximizing, minimizing, selecting, deselecting, and closing, are also possible by directly operating on the shadows.

In addition, the UI displaying a 2D plane and images derived from 3D objects can be extended to multiple display devices. In one embodiment, each display device displays a separate virtual 2D plane based on its own vanishing point. In a further embodiment, multiple display devices jointly display a single virtual 2D plane based on a common vanishing point. Other ways of displaying the virtual 2D planes and derived images are possible.

The derived images need not be strictly shadows. Any forms of derived images are possible. For example, the derived image of an object can be a projection of different shapes, colors, or different levels of transparency. The object can have several projections on multiple surfaces, such as a floor, ceiling, or vertical walls. In further embodiments, a derived image can also be the reflection of the main object.

Additionally, the UI can allow the user to determine whether the 2D virtual plane, such as floor, ceiling, and wall, and the derived images contained therein, are visible. For example, the user can switch to one display mode where only the application objects are displayed without the derived images. The user can switch to another "step-back" mode where the 2D virtual plane comes into view so that the user can manipulate the shadows or other derived images. The UI can further enhance the "step-back" mode by zooming out from the objects being displayed. Switching between these two modes help preserve the limited screen "real estate" for running applications while providing a natural transition into the view where the floor, ceiling, or wall is visible.

Figure 4:
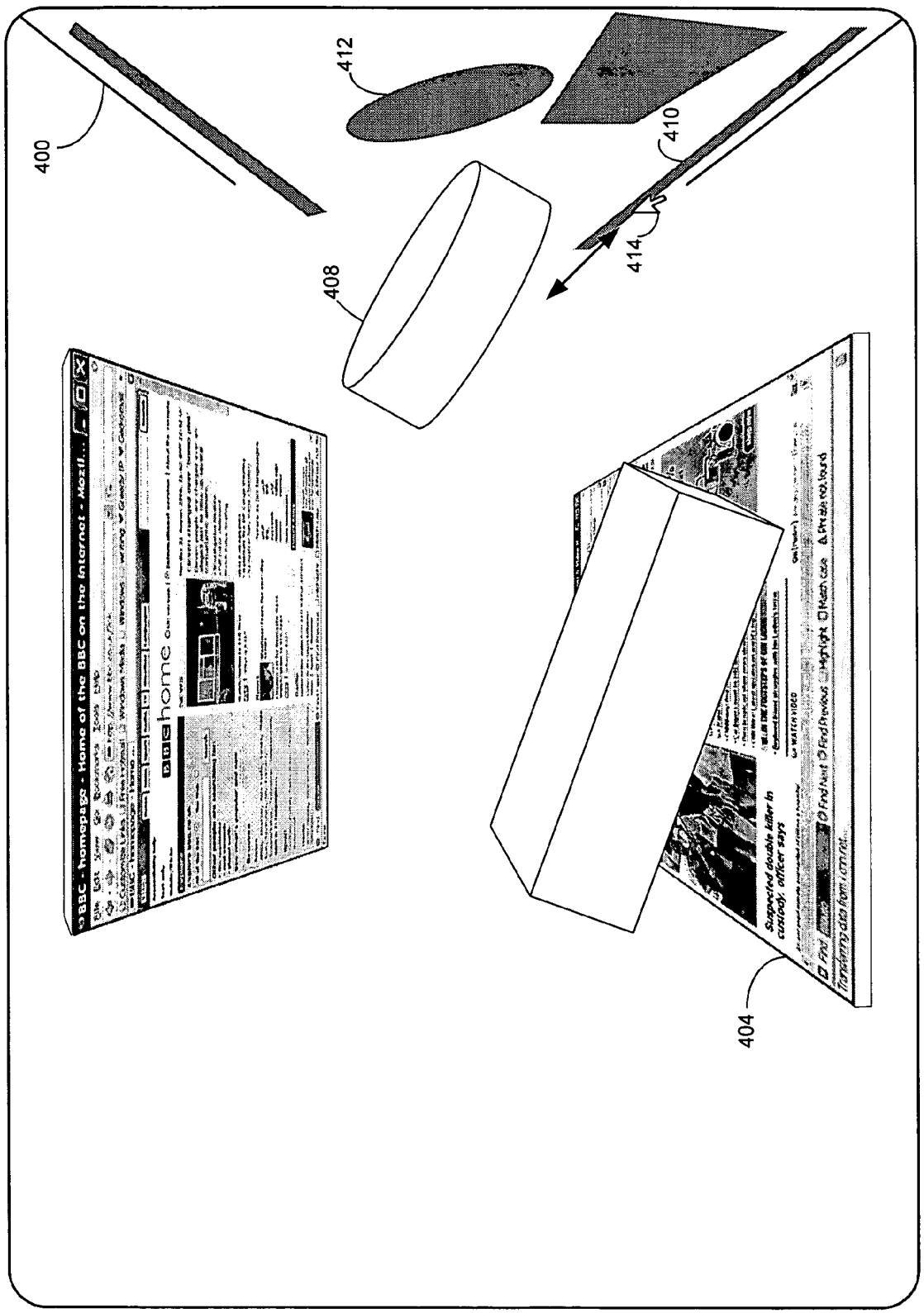
FIG. 4 illustrates a UI displaying 3D objects and their corresponding shadows on a virtual right wall in accordance with an embodiment of the present invention.

FIG. 4 illustrates a UI displaying 3D objects and their corresponding shadows on a virtual right wall in accordance with an embodiment of the present invention. The UI displays a virtual right wall on the right portion of the screen. 3D objects 404 and 408 project shadows 410 and 412, respectively, on virtual wall 400. The UI further allows a user to manipulate object 404 in the Z-axis direction by selecting and dragging shadow 410 within virtual wall 400 with a mouse cursor 412.

In one embodiment, a derived image can contain information about the corresponding object or the application represented by the object. For example, different types of objects, such as web browsers, documents, and file managers, can have different colors. In further embodiments, shadows of applications sharing a common property can have the same color. The color assignment can also be changed dynamically based on the user's request or preference.

The system can further overlay additional information above the shadow. For example, shadows of applications that have some relationship can be linked together with lines. In further embodiments, a shadow can contain the corresponding application's name or internal structural information, and allow a user to operate based on such information.

Figure 5:
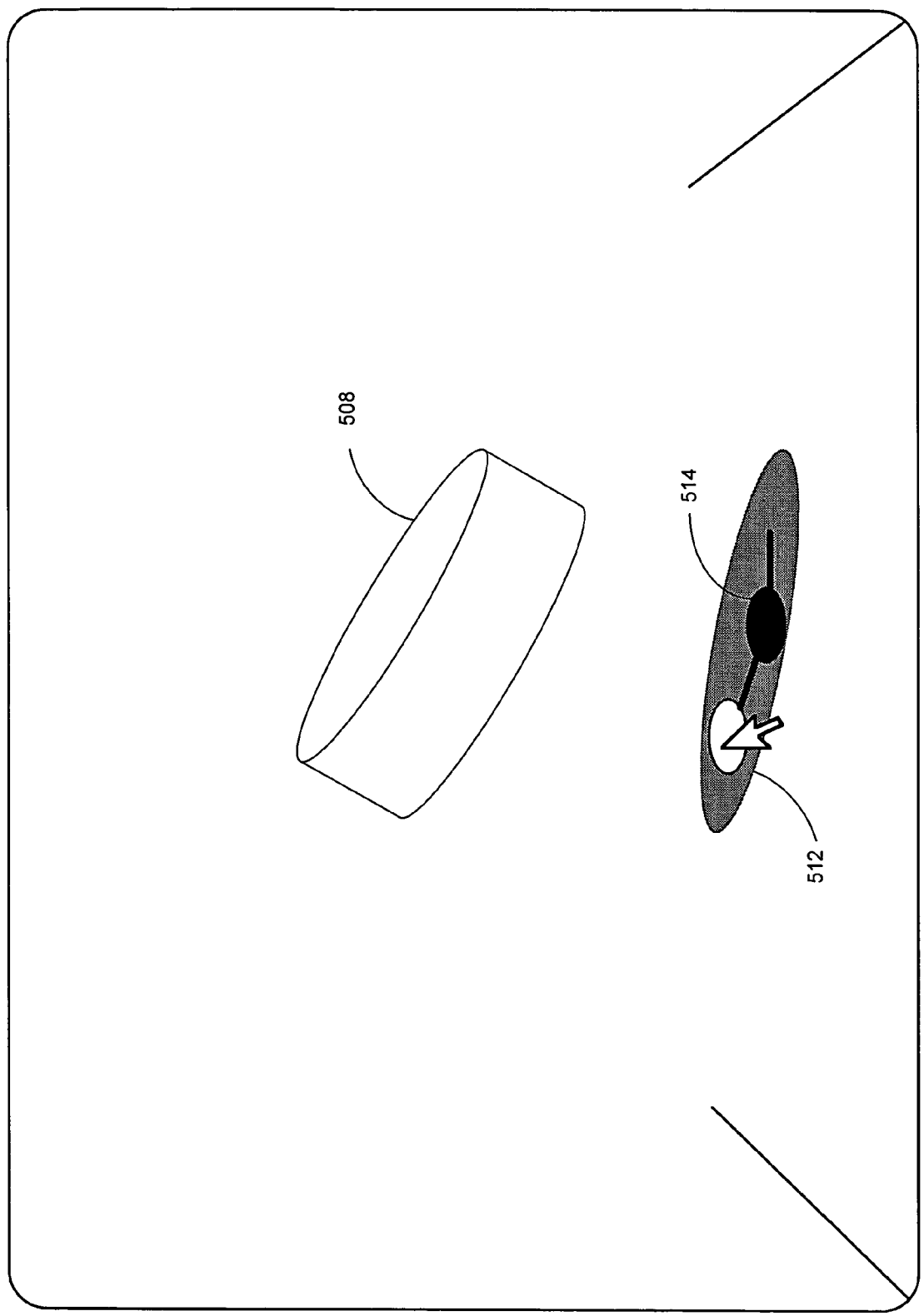
FIG. 5 illustrates a UI displaying a 3D object's shadow which contains information about the object in accordance with an embodiment of the present invention.

FIG. 5 illustrates a UI displaying a 3D object's shadow which contains information about the object in accordance with an embodiment of the present invention. The UI displays a 3D object 508 as well as its corresponding shadow 512. The UI further displays additional representation 514 of internal properties of object 508 in a visually structured manner above shadow 512. The UI allows the user to operate on the properties corresponding to visual representation 514. In one embodiment, the UI allows a user to change the structure or relationship among the elements displayed within the derived image. In a further embodiment, shadow 512 contains different buttons, which can trigger different operations on object 508 when clicked by a user. For example, shadow 512 can contain buttons for selecting, maximizing, minimizing, or closing object 508.

Shadow 512 can be configured to display various properties of an application and to allow a user to manipulate these properties. For example, the main object 508 can be an MP3 player, whereas shadow 512 can be configured to display a dynamic frequency response and/or a graphic equalizer which can be adjusted by the user. In a further example, main object 508 can be a MIDI music player, whereas shadow 512 displays the spatial placement and other characters of musical instruments, such as position, pan, and volume. A user can manipulate the properties or structure displayed within shadow 512. For example, the user can move a piano icon within shadow 512 to the right and adjust its volume. Correspondingly, the MIDI player adjusts the playback of sound to reflect the updated reconstruction of sound field. If the user moves the piano icon further away, or "into" the screen, the MIDI player reduces the piano volume correspondingly.

Figure 6:
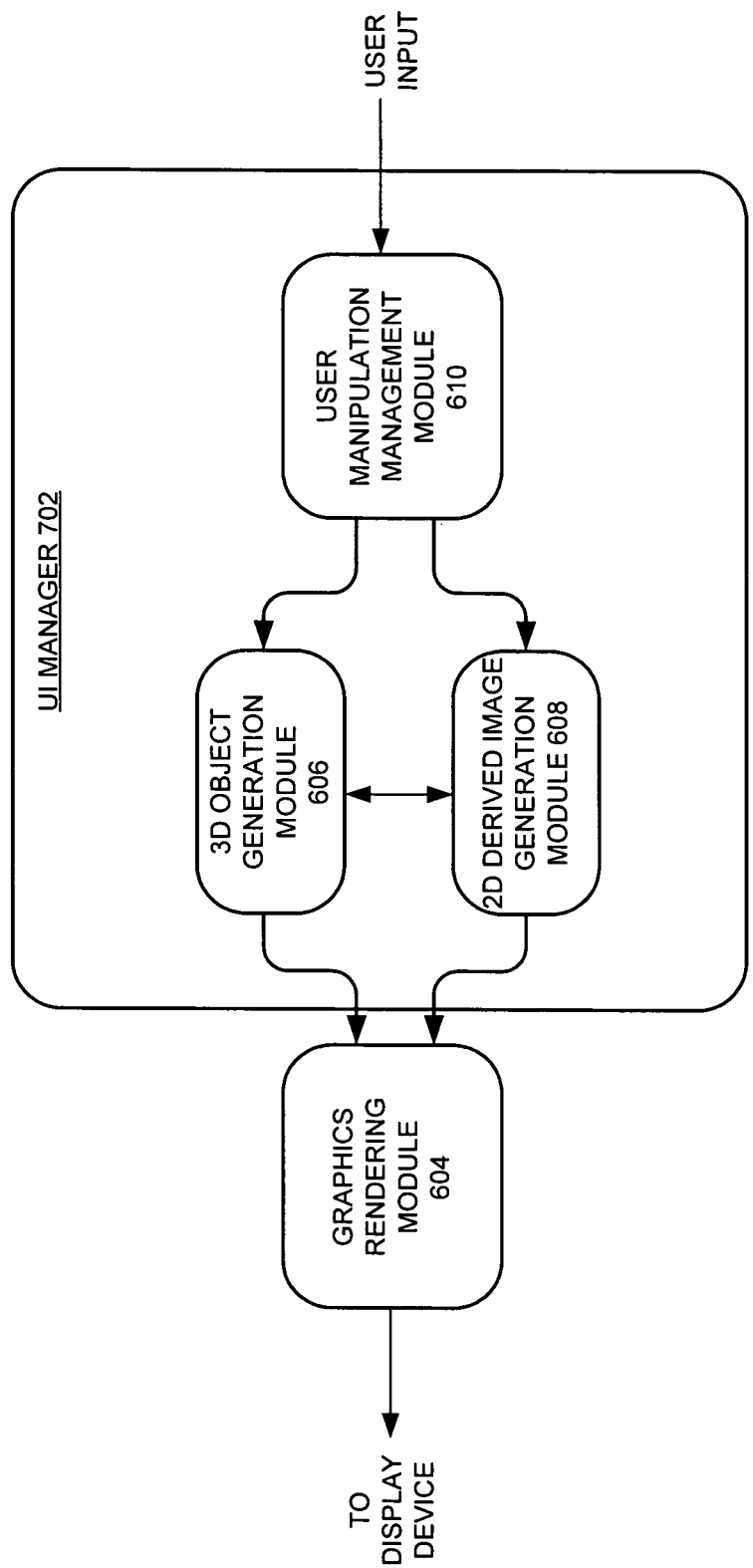
FIG. 6 presents a block diagram illustrating the modules within a UI manager which allows manipulation of derivative images of 3D objects in accordance with an embodiment of the present invention.

FIG. 6 presents a block diagram illustrating the modules within a UI manager which allows manipulation of derivative images of 3D objects in accordance with an embodiment of the present invention. A UI manager 702 contains a 3D object generation module 606, a 2D derived image generation module 608, and a user-manipulation management module 610. 3D object generation module 606 generates 3D objects representing active applications to be displayed. 2D derived image generation module 608 generates the 2D derived image, such as a shadow or reflection, of a 3D object. The result produced by 3D object generation module 606 and 2D derived image generation module 608 is communicated to a graphics rendering module 604, which draws the corresponding 3D object and its 2D derived image on the display device.

User-manipulation management module 610 receives user input such as mouse click and movement, and determines whether the user has operated on the 3D object or its 2D derived image. Module 610 further communicates with 3D object generation module 606 or 2D derived image generation module 608 to effectuate the corresponding manipulation on the proper object. Module 610 can also signal the corresponding application to trigger proper actions.

Figure 7:
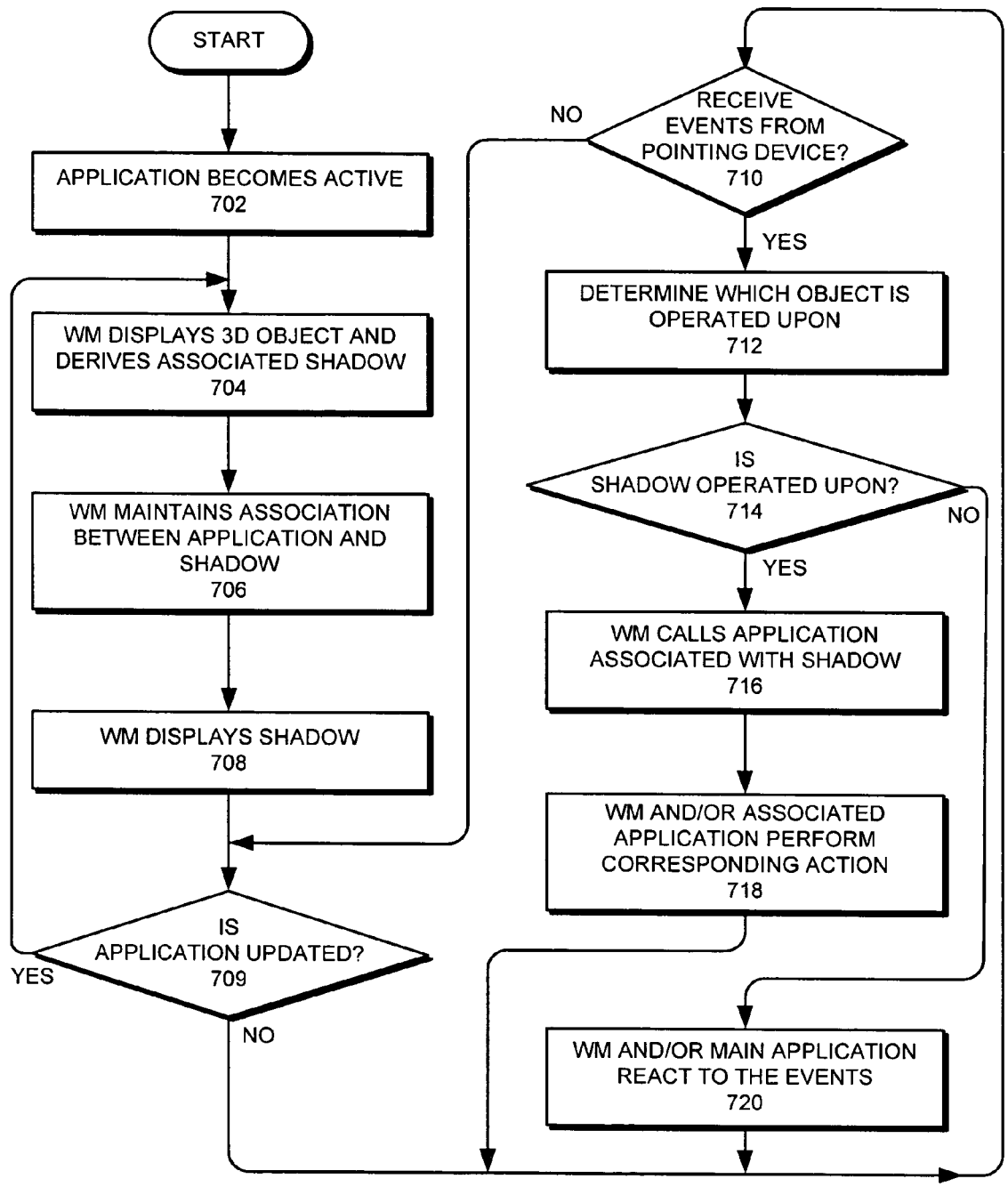
FIG. 7 presents a flow chart illustrating the process of displaying a 3D object's derived image and responding to user operations on the derivative image in accordance with an embodiment of the present invention.

FIG. 7 presents a flow chart illustrating the process of displaying a 3D object's derived image and responding to user operations on the derivative image in accordance with an embodiment of the present invention. In this example, a window manager (WM) controls the displaying and manipulation of objects representing applications. During operation, an application becomes active (step 702). The WM displays a 3D object corresponding to the application and derives a shadow associated with the object (step 704).

While maintaining the association between the application and the shadow (step 706), the WM displays the shadow (step 708). The WM further determines whether the application has been updated (step 709). If updated, the WM continues to display the updated 3D object and shadow (steps 704-708). Otherwise, the WM determines whether events from a user pointing device have been received (step 710). If received, the WM further determines which object is operated upon (step 712) and whether the object's associated shadow has been operated upon (step 714). Otherwise, the WM continues to monitor whether any application update has occurred (step 709).

If the shadow has been operated upon, the WM calls an application associated with the shadow (step 716). Subsequently, the WM and/or the associated application perform the corresponding action (step 718). If the 3D object, instead of the associated shadow, was operated upon, the WM and/or the main application corresponding to the 3D object react to the received events (step 720).

The foregoing descriptions of embodiments of the present invention have been presented only for purposes of illustration and description. They are not intended to be exhaustive or to limit the present invention to the forms disclosed. In particular, the usage of 3D object to present software UI is only one exemplary embodiment. The present invention is not limited by this embodiment, and additional forms of UI presentations are also possible. Accordingly, many modifications and variations will be apparent to practitioners skilled in the art. Additionally, the above disclosure is not intended to limit the present invention. The scope of the present invention is defined by the appended claims.

What is claimed is:

1. A method for manipulating properties of a piece of software running on a computer and whose user interface (UI) is displayed on a computer screen, the method comprising:

defining a virtual three-dimensional (3D) space mapped in the display area of the computer screen;

using a computer to display the software UI in the virtual 3D space based on a 3D coordinate system associated with the virtual 3D space;

deriving an image from the software UI;

displaying the derived image within a virtual two-dimensional (2D) plane substantially parallel to a Z-axis of the 3D space, wherein the Z-axis is along a direction perpendicular to the computer screen; and allowing a user to manipulate properties of the software by manipulating the derived image within the virtual 2D plane, wherein allowing the user to manipulate the properties comprises allowing the user to move the software UI along the Z-axis by dragging the derived image along the virtual 2D plane.

2. The method of claim 1, wherein allowing the user to manipulate properties of the software involves allowing the user to manipulate properties of an application program, a piece of middleware, or an operating system.

3. The method of claim 1, wherein the method further comprises representing the software UI as a 3D object; and wherein displaying the software UI in the virtual 3D space involves perspectively displaying the 3D object based on the 3D coordinate system.

4. The method of claim 3, wherein deriving the image from the software UI involves generating on the virtual 2D plane a projection, a shadow, or a reflection of the 3D object associated with the software UI.

5. The method of claim 4, further comprising:
overlaying additional information for the software above the shadow; and
allowing shadows of related software to be linked by lines.

6. The method of claim 3, further comprising displaying the virtual 2D plane as:
a floor which is placed substantially at the bottom of the computer screen;
a ceiling which is placed substantially at the top of the computer screen;
a left wall which is placed substantially in the left portion of the computer screen; or
a right wall which is placed substantially in the right portion of the computer screen.

7. The method of claim 1, further comprising augmenting the derived image by displaying additional information of the software.

8. The method of claim 7, wherein displaying additional information of the software involves displaying the software's display name.

9. The method of claim 1, wherein displaying the derived image within the virtual 2D plane involves displaying the derived image using a color associated with the software.

10. The method of claim 1, wherein allowing the user to manipulate properties of the software involves allowing the user to move, select, minimize, maximize, or close the software UI by manipulating the derived image by using a 2D pointing device to control a cursor.

11. The method of claim 1, further comprising displaying internal structural information of the software within the derived image.

12. The method of claim 11, further comprising:
allowing the user to operate on the software based on the displayed internal structural information; and
allowing the user to change the structure or relationship among elements displayed within the derived image.

13. The method of claim 12, further comprising displaying buttons within the derived image, wherein the buttons, when clicked by the user, can trigger operations on the software.

14. The method of claim 12, wherein the software is a music player;

wherein the derived image is a shadow of the music player; and wherein the method comprises allowing the user to perform configurations, including configuring a dynamic frequency response or a graphic equalizer, of the music player by operating on the shadow.

15. The method of claim 12;
wherein the software is a music player;
wherein the derived image is a shadow of the music player; and wherein the method further comprises:
displaying characteristics, including spatial placement, pan, and volume, of musical instruments within the shadow; and
allowing the user to manipulate the characteristics of musical instruments by operating on the shadow.

16. The method of claim 1, further comprising allowing the user to determine whether the virtual 2D plane is visible.

17. A computer system for manipulating three-dimensional (3D) objects displayed in a two-dimensional (2D) display, the computer system comprising:
a processor;
a first image-generation mechanism configured to display perspectively a 3D object in a 2D display based on a coordinate system with an X-axis along a horizontal direction on the 2D display, a Y-axis along a vertical direction on the 2D display, and a Z-axis along a direction perpendicular to the plane of the 2D display;
a second image-generation mechanism configured to:
derive a 2D image from the 3D object; and
to display the derived image within a virtual 2D plane substantially parallel to the Z-axis, thereby allowing movement of the derived image within the virtual plane to reflect movement of the 3D object; and
an input processing mechanism configured to allow a user to manipulate the 3D object by manipulating the derived image within the virtual plane, wherein allowing the user to manipulate the 3D object comprises allowing the user to move the 3D object along the Z-axis by dragging the derived image along the virtual 2D plane.

18. The computer system of claim 17, wherein while deriving the 2D image from the 3D object, the second image-generation mechanism is configured to generate a projection, a shadow, or a reflection of the 3D object on the 2D virtual display.

19. The computer system of claim 17, wherein the virtual plane is displayed on the 2D display as:
a floor which is placed substantially at the bottom of the 2D display;
a ceiling which is placed substantially at the top of the 2D display;
a left wall which is placed substantially in the left portion of the 2D display; or
a right wall which is placed substantially in the right portion of the 2D display.

20. The computer system of claim 17, further comprising an augmentation mechanism configured to augment the derived image by displaying additional information for the 3D object.

21. The computer system of claim 20, wherein while displaying additional information of the 3D object, the augmentation mechanism is configured to display the 3D object's name.

22. The computer system of claim 17, wherein while displaying the derived image within the virtual plane, the second display mechanism involves displaying the derived image in a color associated with the 3D object.

23. The computer system of claim 17, wherein while allowing the user to manipulate the 3D object, the input processing mechanism is configured to allow the user to move, select, minimize, maximize, or close the 3D object by manipulating the derived image by using a 2D pointing device to control a cursor.

24. The computer system of claim 17, further comprising a switch mechanism configured to allow a user to determine whether the virtual 2D plane is visible.

25. A method for facilitating manipulation of application objects, the method comprising:
- using a computer to display an object in a 2D display by perspectively displaying the object as 3D based on an X-axis along a horizontal direction on the 2D display, a Y-axis along a vertical direction on the 2D display, and a Z-axis along a direction perpendicular to the plane of the 2D display;
- deriving a 2D image from the object;
- displaying the derived 2D image within a virtual 2D plane substantially parallel to the Z-axis, thereby allowing movement of the derived image within the virtual plane to reflect movement of the object;
- presenting properties of the object within the derived image;
- allowing a user to manipulate the object's properties presented within the derived image by operating on the derived image, wherein allowing the user to manipulate the properties comprises allowing the user to move the object along the Z-axis by dragging the derived image along the virtual 2D plane.

26. The method of claim 25,
- wherein presenting properties of the object involves presenting these proprieties in a visually structured manner; and
- wherein the method further allows the user to change the structure or relationship of the object's properties by operating on the derived image.

27. The method of claim 25,
- wherein the method further comprises allowing the user to manipulate the 3D object by manipulating the derived image within the virtual plane.

28. The method of claim 25, wherein deriving the secondary image from the object involves generating a projection, a shadow, or a reflection of the object on the virtual 2D plane.

* * * * *